Figure 1:
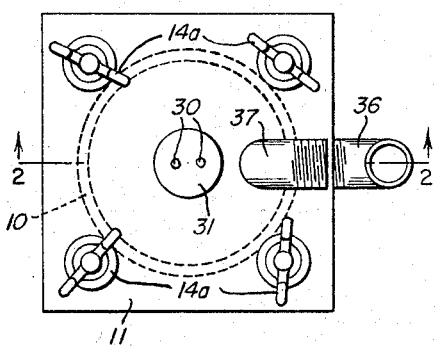

Nov. 22, 1966    A. B. STOUT, JR    3,287,631
METHOD AND APPARATUS FOR MEASURING THE ELECTRICAL
CONDUCTIVITY OF GAS-IMPREGNATED LIQUIDS
WITH SHIELDED ELECTRODES
Filed Oct. 11, 1962

INVENTOR.
ALLISON B. STOUT, Jr.

BY
ATTORNEYS

United States Patent Office 3,287,631
Patented Nov. 22, 1966

3,287,631
METHOD AND APPARATUS FOR MEASURING THE ELECTRICAL CONDUCTIVITY OF GAS-IMPREGNATED LIQUIDS WITH SHIELDED ELECTRODES
Allison B. Stout, Jr., Salt Lake County, Utah, assignor to Kennecott Copper Corporation, New York, N.Y., a corporation of New York
Filed Oct. 11, 1962, Ser. No. 229,787
16 Claims. (Cl. 324—30)

This invention is a continuation-in-part of my presently copending application Serial Number 112,293, filed May 24, 1961, now Patent No. 3,111,392 and relates to systems and methods for measuring the electrical conductivity of liquids. It is concerned with providing an improved electrical conductivity cell for introducing gases into a reagent liquid and for passing an electrical current through the gas-impregnated liquid.

Electrical conductivity cells of the general type with which this invention is concerned are widely used in a variety of circumstances. A very important use is in connection with systems for monitoring the atmosphere with respect to gaseous contaminants, as, for example, the system disclosed in my aforesaid copending application, now Patent No. 3,111,392.

In such a system, provision is made for introducing successive charges of a liquid reagent into a conductivity cell at appropriate time intervals; for drawing a given volume of atmospheric air through each of the successive charges; for passing an electric current through each of the gas-impregnated charges of liquid in the cell; for measuring and recording electrical conductivity values; and for draining the spent charges from the cell following the respective electrical conductivity measurements.

Principal objects in the making of the present invention were to provide for unusually effective contact between gas and liquid in an electrical conductivity measurement cell, without subjecting the sensitive electrodes to abrasion, erosion, dislocation, or disruptive influence by the liquid or gas; to accomplish conductivity measurements during the contacting of the liquid by the gas; to provide for rapidly and effectively draining all of a preceding gas-impregnated charge of reagent liquid from the cell prior to the introduction of a succeeding charge of fresh reagent liquid; to enable quick and easy removal of electrodes for cleaning, platinizing, and calibrating when necessary, without dismantling the entire cell, and quick and easy replacement with a new or already serviced set so the system with which the cell is used need not be shut down; and to provide for simple and easy dismantling and re-assembling of the cell for extensive cleaning periodically.

Features in the attainment of these objects are the provision of gas-dispersing means for disseminating the entering gas throughout a charge of reagent liquid; the protection of measurement electrodes by placing them in a well, below and in restricted and shielded communication with the gas-liquid contact chamber; the incorporation of the electrodes and the shielding therefor in a unitary assembly, which is quickly and easily removable and replaceable with respect to the gas-liquid contact chamber; and the construction of the contact chamber from an open-ended tubular body and removable and replaceable end caps therefor.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 3:
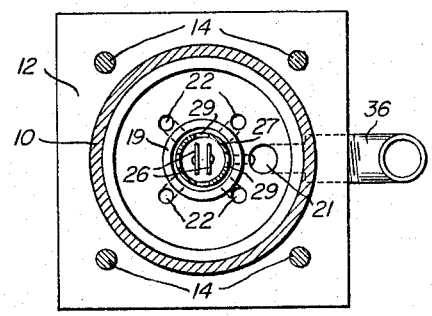
Figure 2:
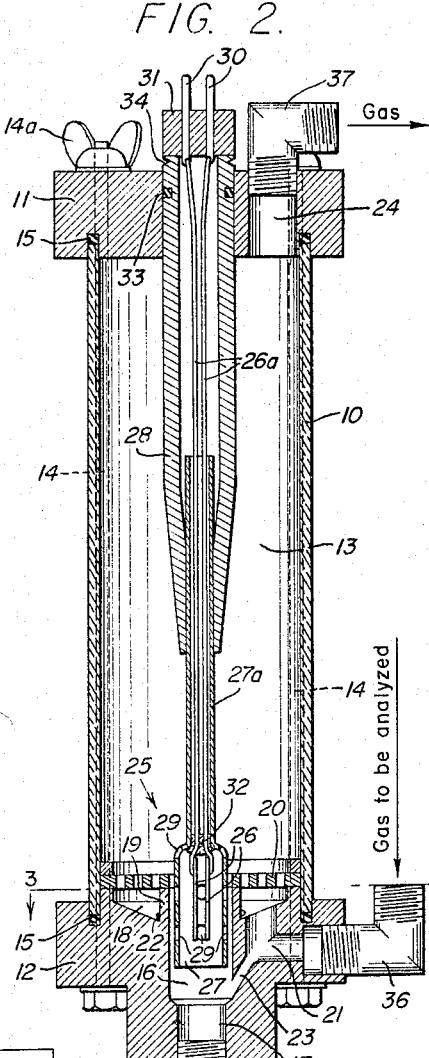

In the drawing:
FIG. 1 is a top plan view of the conductivity measurement cell;
FIG. 2, an axial vertical section taken on the line 2—2 of FIG. 1;
FIG. 3, a horizontal section taken on the line 3—3 of FIG. 2; and
FIG. 4, a schematic representation of a system for measuring the extent of contamination of the atmosphere by noxious gases, wherein the conductivity measurement cell of the foregoing figures is utilized.

Referring to the drawing:
In the form illustrated, the electrical conductivity measurement cell comprises a tubular body 10, advantageously formed from a length of rigid, open-ended, cylindrical tubing of transparent plastic material, and end caps 11 and 12, which, together, define an elongate chamber 13 adapted for vertical positioning.

For the sake of ready demountability and ease of reassembly, the end caps 11 and 12 are respectively provided with circular grooves into which the opposite ends of the tubular body slidably fit. The caps are clamped firmly in position by means of several elongate bolts 14, which interconnect such caps exteriorly of chamber 13 and are preferably equipped with wing nuts 14a. To effectively seal the joints against leakage of liquids and gases, O-rings 15 are placed in the bottoms of the respective grooves so as to be squeezed into sealing positions by the clamping action of bolts 14.

Lower end cap 12 is recessed to provide a well 16 as a lower continuation of the chamber proper 13. Such well is advantageously formed centrally of the cap, so as to be located axially of the cell and receive the lower end of a removable electrode and shield assembly to be described.

A passage 17 extends through lower end cap 12 from the exterior of the cell to the bottom of well 16, for the introduction into and discharge from chamber 13 of a predetermined quantity of a liquid reagent.

Surrounding well 16 as, in effect, a counter-well, is a circular recess 18. Such recess is separated from well 16 by a wall 19, and is covered by a perforated plate 20.

Leading into recess 18 from below and from the exterior of the cell is a passage 21 for the introduction of a gas. Thus, recess 18 serves as a gas gallery, and perforated plate 20 serves as gas-dispersing means to disseminate entering gas through a charge of liquid in the cell. Chamber 13 may be regarded as a gas and liquid contact chamber.

For quickly draining a spent charge of the reagent liquid from the cell, a series of drain passages 22 interconnect gas gallery 18 with well 16, preferably near the upper end of the latter, as shown, and a drain passage 23 leads from the lowest level of gas inflow passage 21.

Upper end cap 11 is provided with a gas withdrawal or discharge passage 24 and with a central opening through which the previously mentioned electrode and shield assembly is insertable in and removable from the cell.

The electrode and shield assembly 25 includes a pair of precisely spaced electrodes 26 in the form of plates of an inert, highly conductive metal such as platinum coated with fragile sponge platinum. These electrodes extend deeply into well 16 and are surrounded by a protective shield 27, which also extends deeply into the well and has a diameter somewhat less than that of the well to provide a restricted annular passage therebetween. Shield 27 is preferably provided with ports 29, which, along with the aforesaid annular passage and the several drain passages 22 and 23, afford restricted passage for and circulation of liquid from gas-liquid contact chamber 13.

In the present instance, shield 27 has a tubular upward extension 27a securely fitted into and sealed to the lower end of a tubular member 28 as by means of a suitable adhesive cement. Such member 28 passes snugly through the previously mentioned receiving opening therefor in upper end cap 11 and serves as a further shield extension for protecting electrical leads to the electrodes. Electrical leads 26a, advantageously wires, extend downwardly through the interior of tubular member 28 and through the interior of tubular shield extension 27a from connection with electrical plug-in terminals 30, which project outwardly of a cap member 31 for connection with a suitable source of electrical energy. The leads 26a pass through and are spaced apart by a seal 32, advantageously a glass bead, at the lower end of tubular shield extension 27a.

To seal the electrode and shield assembly 25 in place, at least one O-ring 33 is provided in an accommodating recess in either one or the other of the mating faces of tubular member 28 and upper end cap 11, but preferably that of tubular member 28 as here shown in FIG. 2. For facilitating insertion and removal of such assembly 25 relative to the cell, considering the tight friction fit provided by such O-ring, a lifting groove 34 is advantageously formed exteriorly of the outwardly protruding end of the assembly for engagement by some suitable tool if found necessary.

Means for interconnecting the several passages with utility lines advantageously take the form of screw-threaded connection fittings, such as those indicated at 35, 36, and 37.

Figure 4:
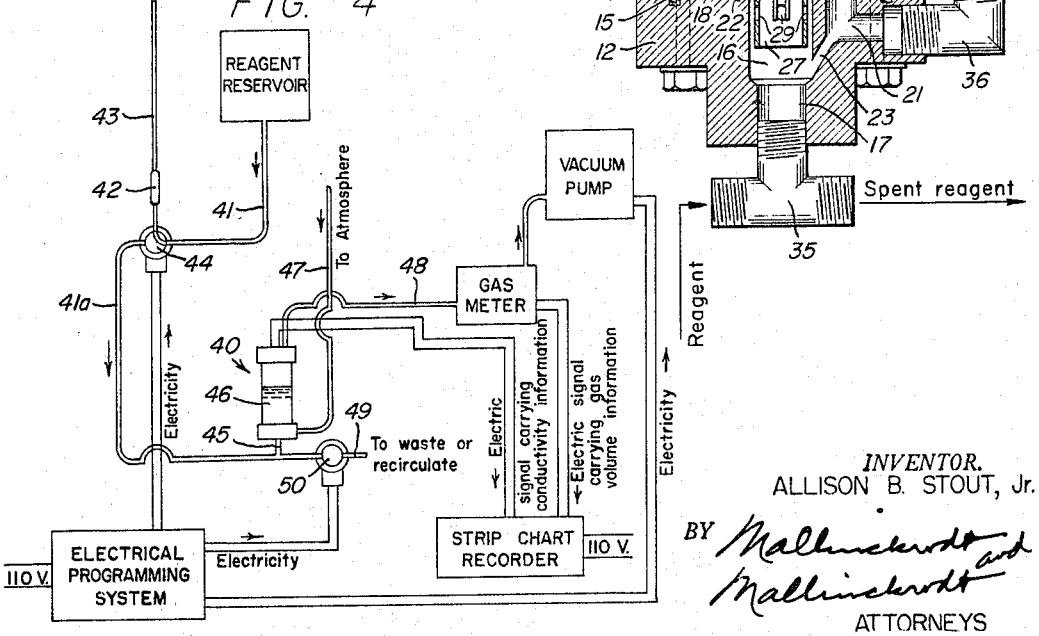

As previously indicated, the electrical conductivity measurement cell can be used in a variety of situations. The system of FIG. 4 is one example. It is more particularly described in my aforesaid copending application Serial Number 112,293, filed May 24, 1961, now Patent No. 3,111,392, entitled "Electrical Conductivity Analyzer for Acid Gases."

This system is adapted to take samples of the atmosphere periodically, e.g. every half hour, on a continuing basis and to subject such samples to analyses in the electrical conductivity measurement cell of the foregoing figures, here designated 40, the results being recorded on a standard strip chart recorder, as indicated. All of this is done automatically.

A supply of a suitable reagent, usually water made very slightly acid by the addition of a small amount of dilute acid to guard against alkalinity, is maintained in a reservoir (indicated as such) for gravity feed by way of a conduit 41 to a charge-measuring chamber 42 located below such reservoir but above conductivity cell 40. Such charge-measuring chamber 42 preferably has an elongate, open-ended, upward continuation 43 of very small diameter, for example, a capillary tube rising through the height of the reservoir in conventional manner as an air vent.

A feature of this system resides in the fact that a normally open valve 44 is interposed in conduit 41 so that a hydrostatic balance will be achieved between reservoir and charge-measuring chamber and so that the latter will be normally filled and have provision for maintaining volume constant despite liquid contraction or expansion.

Valve 44 is a two-way valve as indicated making both inflow and outflow connections with conduit 41 and making an outflow connection with a conduit 45 leading into cell 40 by way of one branch of the T-fitting 35, FIG. 2. The normal setting of the valve establishes flow communication between both parts of conduit 41, as shown, while the alternative setting establishes flow communication between charge-measuring chamber 42 and conduit 45 by way of a common portion 41a of conduit 41. Valve 44 closes passage between charge-measuring chamber and conductivity measurement cell 40 when the passage between the reservoir and the charge-measuring chamber is open and vice versa.

It will be realized that the action of the one two-way valve 44 can also be achieved, but at greater cost and inconvenience, by the provision of individual valves in individual conduits.

A measured charge of reagent 46 is introduced into the electrical conductivity measurement cell 40 from charge-measuring chamber 42 for each test performed. A tube 47 extends from the location where atmospheric air is to be sampled to connection with fitting 36, FIG. 2, of gas-introduction passage 21 of the cell. A gas-exhaust tube 48 extends from connection with fitting 37, FIG. 2, of gas-withdrawal passage 24 of cell 40 to a vacuum pump, as indicated, a gas meter being interposed in the line to indicate the volume of atmospheric air bubbled through the reagent 46 during operation of the vacuum pump for any given test.

Drainage of the used body of reagent from cell 40 following any given test is accomplished through drain line 49 under the control of a normally closed valve 50, such drain line being connected with the opposite branch of T-fitting 35, FIG. 2, of the cell.

Automatic control of the apparatus so far described is carried out in predetermined time sequence by any suitable programming system and any suitable control instrumentalities, for example, those illustrated and described in my aforereferred to application Serial Number 112,293, now Patent 3,111,392.

Both the gas meter and the electrodes 26, FIG. 2, are electrically connected with a strip chart recorder, as indicated, so that correlated gas volume and electrical conductivity measurements are made continuously throughout each period of operation of the system. This arrangement is a conventional one, for example, there being provided in the gas meter a switch (not shown), which is closed each time a given volume of air passes through the meter and which, when closed, energizes a solenoid-operated pen (not shown) of the recorder.

It can be seen from the above that the invention also involves a method of quantitatively analyzing gases, wherein a gas to be analyzed is disseminated as small bubbles throughout a measured charge of liquid reagent while the electrodes are shielded from both the entering gas and the gas bubbles. The gas-impregnated liquid reagent is circulated about and in contact with the electrodes in substantially bubble-free condition. This not only protects the fragile covering of the electrodes from abrasion by particles entrained in the gas and by the force of the gas itself, but prevents the accumulation of gas bubbles on and in the vicinity of the electrodes so that accurate conductivity measurements are assured. Circulation is advantageously induced by the entering gas, as by means of aspiration of liquid from well 16 through drain passage 23.

It should be noted that the perforated plate 20 is perforated throughout by a multiplicity of small diameter holes closely spaced relative to one another. Although the diameter of the holes and the spacing thereof may vary depending upon the nature of the gas to be analyzed, it should be borne in mind that the holes should always be as small as possible without having any undue tendency to clog by reason of foreign matter carried by the gas. Very satisfactory results have been obtained in instances of atmospheric air when the holes through the perforated plate were 0.063 of an inch in diameter and the spacings between holes were about double the diameter of the holes.

Whereas there are here illustrated and described a preferred form of electrical conductivity measurement cell and a preferred form of a system for analyzing acid gases incorporating such cell, which cell and system are presently regarded as the best modes of carrying out the invention, it should be understood that various changes may be made without departing from the generic concepts particularly pointed out in the claims which follow.

I claim:

1. An electrical conductivity measurement cell, comprising means defining a vertically elongate chamber closed at both ends but having a flow passage through the lower end for admitting and discharging liquid, a second flow passage through the lower end, above the first flow passage, for admitting a gas into a charge of liquid in the chamber, a third flow passage through the upper end for withdrawing gas from the chamber, and a well in the lower end extending from the chamber to communication with the first flow passage; gas-dispersing means above the second flow passage and laterally of the well, for disseminating the entering gas through liquid present in the chamber; a pair of electrodes extending into and terminating within the well; and shielding means within said chamber including a turbulence shield surrounding said electrodes within the well.

2. An electrical conductivity measurement cell, comprising means defining a vertically elongate chamber closed at both ends but having a flow passage through the lower end for admitting and discharging liquid, a second flow passage through the lower end, above the first flow passage, for admitting a gas into a charge of liquid in the chamber, a third flow passage through the upper end for withdrawing gas from the chamber, and a well in the lower end extending from the chamber to communication with the first flow passage, said well being located axially of the cell and surrounded by a counter-well forming a gas gallery, there being a wall separating the gas gallery from the well; gas-dispersing means above the second flow passage and laterally of the well, for disseminating the entering gas through liquid present in the chamber, said gas-dispersing means being a perforate wall extending over the top of said counter-well, and the second flow passage leading into the gas gallery; a pair of electrodes extending into and terminating within the well; and shilding means within said chamber, including a turbulence shield within the well and surrounding said electrodes.

3. The cell of claim 2, wherein a series of drain passages extends from the gas gallery to the well, for speeding discharge of liquid from the cell and for facilitating circulation of gas-impregnated liquid between the chamber proper and the well.

4. The cell of claim 2, wherein the shielding means has restricted flow passages therethrough and therearound.

5. The cell of claim 2, wherein electrical leads for the electrodes extend through the upper end of the cell, axially thereof, and axially downwardly through the chamber into the well; and the shielding means surrounds the electrical leads throughout their extension within the chamber.

6. The cell of claim 5, wherein there is an axial opening through the upper end of the means defining the chamber; the electrodes, leads therefor, and the shielding means are formed as a unitary assembly removably and replaceably extending into the chamber through the axial opening; and sealing means against the passage of gas is provided between said upper end and said assembly.

7. The cell of claim 6, wherein the sealing means comprises at least one O-ring and accommodating groove therefor.

8. The cell of claim 1, wherein passage means are provided between the second flow passage and the lower part of the well for aspirating liquid from the well as gas is introduced into the cell, whereby circulation of gas-impregnated liquid through the well is induced.

9. An electrical conductivity measurement cell, comprising an open-ended, tubular body defining a vertically elongate chamber for the retention of a liquid; removable caps closing the upper and lower ends, respectively, of said body, there being a flow passage through the lower cap for admitting and discharging liquid and a second flow passage above the first for admitting gas into a charge of liquid in the chamber, there also being a well in the lower cap extending from the chamber to communication with the first flow passage, and there being a flow passage through the upper cap for withdrawing gas from the chamber; gas-dispersing means above said second flow passage and laterally of the well, for disseminating the entering gas through liquid present in the chamber; a pair of electrodes within the well and having electrical leads extending through the upper cap into and through the chamber to termination within the well; and a shielding means within said chamber, including a turbulence shield surrounding said electrodes within the well.

10. The cell of claim 9, wherein the caps are grooved to slidably receive the respective ends of the tubular body; sealing means are provided in the grooves; and a series of elongate bolts interconnect the caps exteriorly of the tubular body and securely but removably clamp them in place.

11. The cell of claim 10, wherein the sealing means are O-rings at the bottom of the respective grooves.

12. The cell of claim 9, wherein the well is located axially of the cell, and there is an opening through the upper cap axially of the cell; the electrodes and the shield are formed as a unitary assembly which removably and replaceably extends through and has its upper end fitted into and closing said opening; and sealing means against the passage of gas is provided between the upper end of said assembly and the upper cap.

13. The cell of claim 12, wherein the sealing means comprises at least one O-ring and accommodating groove therefor.

14. An electrical conductivity measurement cell, comprising means defining a chamber for the retention of liquid; means for introducing liquid into and discharging liquid from the chamber; means for dispersing a gas through liquid in the chamber; electrodes within the chamber; and a shield against turbulence on the electrodes positioned within the chamber, said shield surrounding the electrodes.

15. The cell of claim 14, wherein there is a well at the bottom of the chamber into which the electrodes project, and the shield surrounds the electrodes within the well, there being restricted passage means between the chamber proper and the well.

16. A method of quantitatively analyzing gases by measuring the electrical conductivity of liquid reagents in which the gases are dissolved, comprising the steps of disseminating a multiplicity of fine bubbles of a gas to be analyzed throughout a predetermined volume of a liquid reagent, so that the gas is quickly absorbed by and substantially throughout the entire volume of liquid to render all parts of said volume representative of the quantity of gas introduced; circulating the gas-impregnated liquid, in substantially bubble-free condition, into contact with electrical conductivity measurement means; shielding said measurement means from said gas as it is disseminated throughout said liquid; and measuring the electrical conductivity of said gas-impregnated liquid.

References Cited by the Examiner

UNITED STATES PATENTS

| | | | |
|---|---|---|---|
| 2,462,293 | 2/1949 | Thomas | 23—232 |
| 2,789,887 | 4/1957 | Cruikshank | 23—254 |
| 2,880,071 | 3/1959 | Gelman | 23—254 |
| 2,949,345 | 8/1960 | Clauss | 23—254 |

WALTER L. CARLSON, *Primary Examiner.*

FREDERICK M. STRADER, *Examiner.*

C. F. ROBERTS, *Assistant Examiner.*